United States Patent [19]

Yamaoka et al.

[11] Patent Number: 5,040,091
[45] Date of Patent: Aug. 13, 1991

[54] FEED-THROUGH CAPACITOR

[75] Inventors: Osamu Yamaoka; Katsumi Yukawa; Shinichi Kobayashi; Hideomi Kurihara; Hisao Yuasa; Shunjiro Imagawa; Jun Harada, all of Nagaokakyo, Japan

[73] Assignee: Murata Manufacturing Co., Ltd., Japan

[21] Appl. No.: 509,311

[22] Filed: Apr. 13, 1990

[30] Foreign Application Priority Data

Apr. 15, 1989 [JP] Japan ................. 1-96031

[51] Int. Cl.⁵ .......... H01G 4/42; H01G 7/00
[52] U.S. Cl. .................. 361/302; 29/25.42
[58] Field of Search ........... 29/25.42; 361/302, 321, 361/323, 320, 539; 525/537

[56] References Cited

U.S. PATENT DOCUMENTS

| | | | |
|---|---|---|---|
| 3,989,531 | 11/1976 | Orlando et al. | 106/15 FP |
| 4,654,751 | 3/1987 | Tokura et al. | 361/328 |
| 4,733,328 | 3/1988 | Blazej | 361/320 |
| 4,734,470 | 3/1988 | Kawabata et al. | 525/537 |
| 4,768,129 | 8/1988 | Sasaki et al. | 361/302 |
| 4,872,085 | 10/1989 | Tsuzurahara | 361/302 |

Primary Examiner—Donald A. Griffin
Attorney, Agent, or Firm—Ostrolenk, Faber, Gerb & Soffen

[57] ABSTRACT

A feed-through capacitor in which a composite dielectric layer made of a mixed material containing a resin material and dielectric material powder is arranged between a feedthrough terminal and an outer electrode terminal surrounding this feedthrough terminal, a capacitance being formed between the feedthrough terminal and the outer electrode terminal.

26 Claims, 7 Drawing Sheets

FEED-THROUGH CAPACITOR

BACKGROUND OF THE INVENTION

1. Field of the Invention

The present invention relates to feed-through capacitors having a structure comprising a feedthrough terminal and an outer electrode terminal surrounding through a dielectric layer which in turn surrounds the feedthrough terminal.

2. Description of the Prior Art

In a magnetron in a microwave oven or the like, a filter circuit is generally inserted into a power supply line so as to prevent a microwaves from leaking as noise via the power supply line or the like. Two conventional types of feed-through capacitors used in this type of filter circuit are respectively shown in FIGS. 9 and 11.

Each of the feed-through capacitors is constructed by using a dielectric block made of ceramics obtained by molding a ceramic dielectric material having a high dielectric constant in a block shape and sintering the same.

A dielectric block 4 of a feed-through capacitor 1 is shown in a cross-sectional view in FIG. 9 and is shown in perspective in FIG. 10. This dielectric block 4 is approximately elliptical in cross section and has two through holes 2 and 3 penetrating from its upper end surface to its lower end surface. Electrodes 6a and 6b separated by a slit-shaped groove 5 are formed on the upper surface of the dielectric block 4, while an electrode 7 is formed on the lower end surface thereof. The electrodes 6a and 6b and the electrode 7 are opposed to each other, two capacitances being formed therebetween.

Connecting terminal boards 11 and 12 are respectively soldered to the electrodes 6a and 6b formed on the dielectric block 4, as shown in FIG. 9. A hole 11a is formed in the connecting terminal board 11. A feedthrough terminal 13 is inserted into the hole 11a and is soldered or welded to the inner peripheral surface of the hole 11a. As obvious from FIG. 9, the feedthrough terminal 13 is inserted into the through hole 2 with it not being in contact with the inner peripheral surface of the through hole 2 of the dielectric block 4.

Similarly, the other feedthrough terminal 14 is inserted into a hole 12a formed in the other connecting terminal board 12 and is soldered or welded to the inner peripheral surface of the hole 12a.

A ground terminal board 16 is soldered to the electrode 7 on the lower end surface of the dielectric block 4. The ground terminal board 16 has a hole 16a for pulling out the feedthrough terminals 13 and 14 to pass downward. The electrode 7 is soldered to the outer peripheral surface of the hole 16a. An insulating case 17 and another insulating case 18 are respectively arranged above and the below the connecting terminal board 16. Insulating resin 19 is filled in the insulating cases 17 and 18.

A feed-through capacitor 21 shown in FIG. 11 is constructed by using a dielectric block 25. In the dielectric block 25, electrodes 22 and 23 are formed on the inner peripheral surfaces of through holes 2 and 3 in which feedthrough terminals 13 and 14 are respectively inserted. In addition, an electrode 24 is formed on the outer side surface of the dielectric block 25 so as to be opposed to the electrodes 22 and 23.

The electrodes 22 and 23 in the through holes 2 and 3 and the electrode 24 formed on the outer side surface of the dielectric block 25 are opposed to each other with the dielectric block 25 being interposed therebetween, a capacitance being formed therebetween.

The feedthrough terminals 13 and 14 are directly soldered to the electrodes 22 and 23 in the through holes 2 and 3 of the dielectric block 25 by solder 26. In addition, the dielectric block 25 is inserted into a hole 27 provided in a ground terminal board 16. The electrode 24 formed on the outer side surface of the dielectric block 25 is soldered to the ground terminal board 16.

Insulating cases 17 and 18 are respectively arranged on one side and the other side of the ground terminal board 16. Insulating resin 19 is filled in the insulating cases 17 and 18.

The feed-through capacitors constructed by using the dielectric blocks 4 and 25 obtained by molding the ceramic dielectric material in a block shape and sintering the same as described above can easily satisfy the following performance requirements for a filter circuit in the magnetron in the microwave oven.

(a) filter performance; to absorb noise in a frequency band of the television or radio wave (30 to 300 MHz) and in the microwave range (1 GHz or higher) and prevent conduction and radiation to the exterior.

(b) voltage proof performance; to withstand a rush pulse and a rise pulse of 10 to 20 kV$_{O-P}$ at the time of the oscillation of the magnetron.

In particular, the filter performance described above in (a), a requires real capacitance of 100 pF or more in the frequency range of a television or radio wave, which is easily satisfied by using a ceramic dielectric body. In addition, the noise in the microwave band is mainly radiation noise. However, the use of the ceramic dielectric body makes it easy to damp the radiation noise.

In the conventional feed-through capacitors using the dielectric blocks 4 and 25 obtained by molding the ceramic dielectric material in a block shape and sintering the same, however, the shapes and the structures of the dielectric blocks 4 and 25 are complicated. Consequently, the feed-through capacitors have the disadvantage in that the fabrication of the dielectric blocks 4 and 25 having such complicated shapes and structures is very troublesome, resulting in increased cost.

Furthermore, in the above described feed-through capacitors, high voltage performance is also required. Accordingly, the outer peripheral surfaces of the dielectric blocks 4 and 25 are molded and enclosed by insulating resin of the epoxy resin system 19. However, the coefficient of linear expansion $\alpha$ and the modulus of elasticity E of the dielectric blocks 4 and 25 are significantly different from those of the feedthrough terminals 13 and 14 and the insulating resin 19. Consequently, the conventional feed-through capacitors 1 and 21 also have the disadvantages in that the insulating resin 19 and the dielectric blocks 4 and 25 can be, for example, crazed, cracked or stripped off in performing a test of a thermal cycle such as a heat cycle.

SUMMARY OF THE INVENTION

Accordingly, an object of the present invention is to provide a new feed-through capacitor which is relatively simple in structure, can significantly reduce the difficulty of the fabricating processes and is technically reliable.

The feed-through capacitor according to the present invention is characterized by comprising at least one feedthrough terminal, an outer electrode terminal arranged so as to surround the feedthrough terminal, and a composite dielectric layer provided in at least a region between the feedthrough terminal and the outer electrode terminal and made of a mixed material containing a resin material and dielectric powder.

According to the present invention, the composite dielectric layer is made of a mixed material containing dielectric material powder mixed with resin. Accordingly, the composite dielectric layer can be simply molded in a required shape from its fluid state by, for example, insertion-molding or injection-molding. Consequently, the fabricating processes of the feed-through capacitor are simplified, thereby allowing the cost thereof to be significantly reduced.

Furthermore, the values of the coefficients of linear expansion of the feedthrough terminals and the composite dielectric layer can be made relatively close to each other by selecting the resin material and the dielectric powder constituting the composite dielectric layer. Accordingly, heat shock resistance is improved. In addition, the voltage resistance per unit thickness is increased, as compared with a feed-through capacitor using a ceramic dielectric block because a resin material superior in insulating properties is used as a base material. Consequently, the feed-through capacitor can be made small in size.

The feed-through capacitor according to the present invention can be fabricated by, for example, the following method. The feed-through capacitor can be fabricated by the method comprising the steps of preparing at least one feedthrough terminal and an outer electrode terminal of such size that the feedthrough terminal can be inserted into the interior thereof, arranging the feedthrough terminal in the outer electrode terminal so as not to come into contact with the outer electrode terminal, and filling the space between the outer electrode terminal and the feedthrough terminal with a mixed material containing a resin material and dielectric powder in its molten state and solidifying the same to form a composite dielectric layer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a perspective view showing the step of inserting outer electrode terminals into a connecting terminal board, FIG. 3 is a perspective view showing the step of inserting feed-through terminals, and FIG. 4 is an exploded perspective view showing the step of attaching the insulating cases;

DESCRIPTION OF THE PREFERRED EMBODIMENTS

Figure 1:
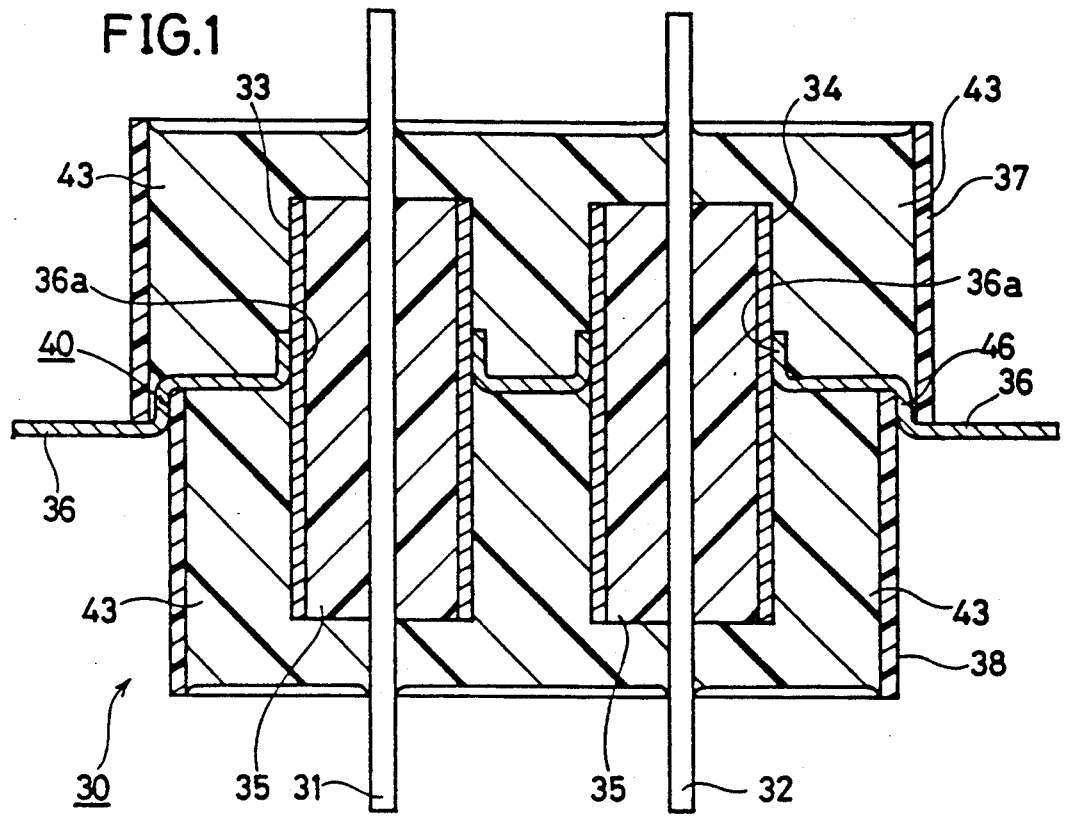
FIG. 1 is a cross-sectional view showing a structure of a feed-through capacitor according to an embodiment of the present invention.

FIG. 1 is a cross-sectional view showing a feed-through capacitor according to an embodiment of the present invention. The details of the structure of this feed-through capacitor 30 will be made clear while explaining the fabricating method.

The above described feed-through capacitor 30 comprises two feedthrough terminals 31 and 32, cylindrical electrodes 33 and 34 serving as outer electrode terminals in which the two feedthrough terminals 31 and 32 respectively penetrate in coaxial positions, composite dielectric bodies 35 respectively filling the interior of the cylindrical electrodes 33 and 34, a ground terminal board 36, and insulating cases 37 and 38.

Figure 2:
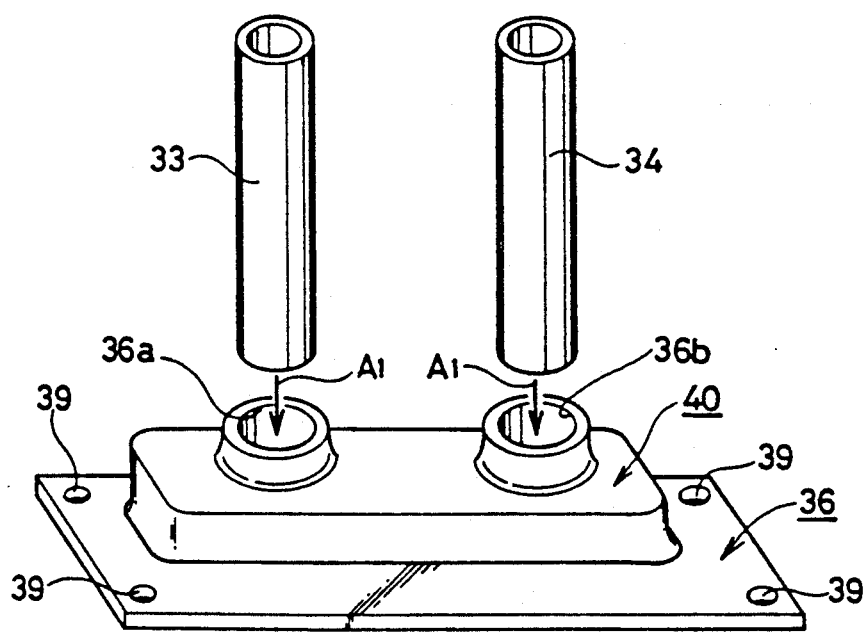
FIGS. 2 to 4 are exploded perspective views for explaining the steps of assembling the feed-through capacitor shown in FIG. 1, where

Both the above described cylindrical electrodes 33 and 34 comprise cylindrical pipes, which are respectively inserted into fixing holes 36a and 36b formed in the ground terminal board 36, as represented by arrows $A_1$ in FIG. 2, and are conductively fixed to the above described ground terminal board 36 by welding, soldering crimping or caulking.

Figure 3:
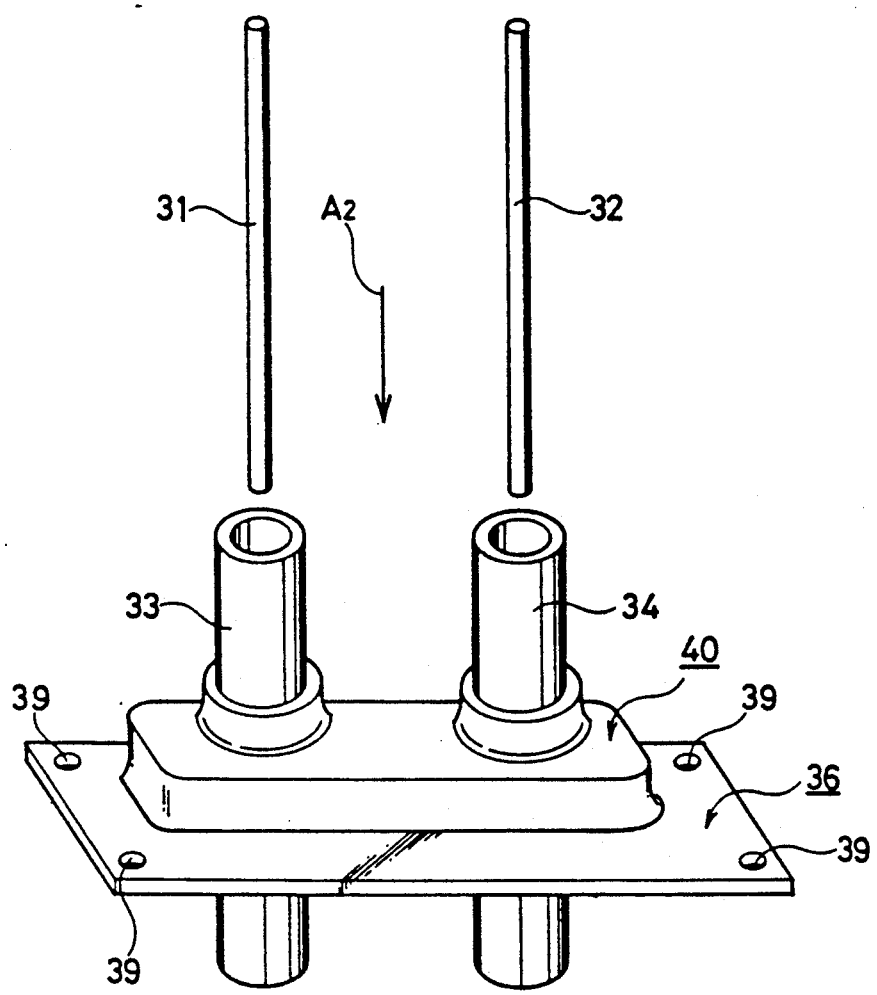

The feedthrough terminals 31 and 32 are inserted into the above cylindrical electrodes 33 and 34 from openings at their respective upper ends, as represented by an arrow $A_2$ in FIG. 3. In such a state, the composite dielectric bodies 35 are then respectively filled into the above cylindrical electrodes 33 and 34 and hardened by an insertion-molding process with the feedthrough terminals 31 and 32 being respectively held coaxially in the above cylindrical electrodes 33 and 34.

The above described composite dielectric bodies 35 contain 20 to 97 percent ceramic powder of the $BaTiO_3$ system, $SrTiO_3$ system or another system by weight as a filler, and, for example, epoxy resin as a base.

The above described ground terminal board 36 is made of a metal plate such as an aluminum plate and is a square plate having attaching holes 39 formed in its four corners for attaching this feed-through capacitor 30 to a case or the like of a magnetron. The ground terminal board 36 is provided with an extrusion which projects from the plane of the ground terminal board 36, while remaining substantially parallel thereto portion 40 formed by extrusion. The above described fixing holes 36a and 36b are formed in this extrusion portion 40 (see FIGS. 1 and 2).

Figure 4:
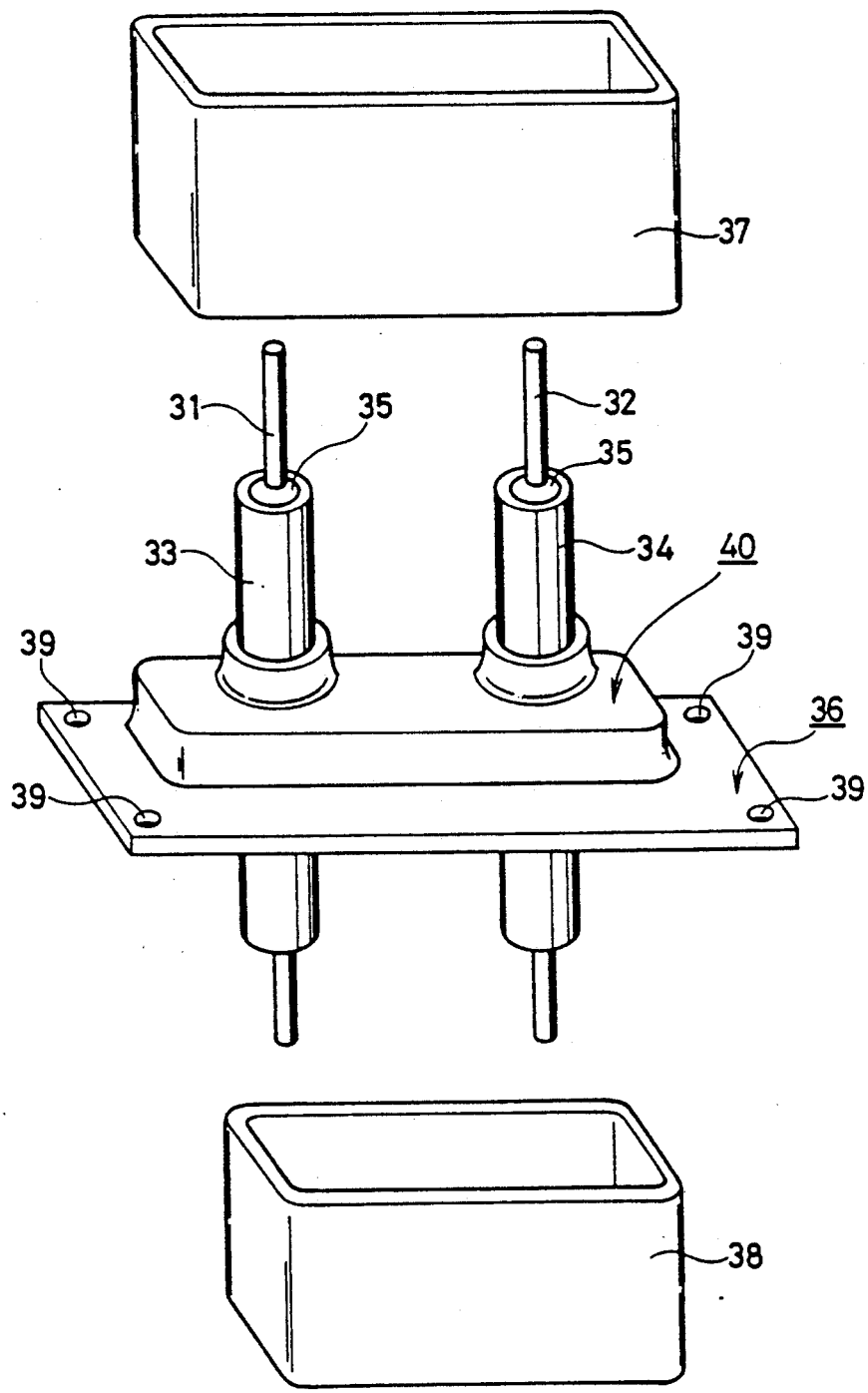

A tubular insulating case 37 made of resin such as polybutylene terephthalate is mounted on one side of the above ground terminal board 36 such that the above extrusion portion 40 is positioned inside of the insulating case 37, as shown in FIG. 4. In addition, another tubular insulating case 38 made of the same resin material as that of the insulating case 37 is mounted on the other side of the above ground terminal board 36 such that the insulating case 38 is inserted into the extrusion portion 40.

Insulating resin 43 such as epoxy resin is filled into the above two insulating cases 37 and 38.

A capacitance is produced between the above feed-through terminals 31 and 32 and the cylindrical electrodes 33 and 34 using as a dielectric body the above composite dielectric bodies 35.

In such a structure, the above described composite dielectric bodies 35 are formed by placing the mixed material in its fluid state in the cylindrical electrodes 33 and 34 in which the feedthrough terminals 31 and 32 are supported coaxially and then hardening the mixed material by a process such as so-called insertion-molding. Accordingly, a dielectric body of the feed-through capacitor 30 can be simply constructed, thereby making it easy to fabricate the feed-through capacitor 30. Consequently, the cost of the feed-through capacitor 30 is significantly reduced.

Furthermore, the following is an example of the feed-through capacitor 30 as described in FIG. 1:

feedthrough terminals 31 and 32: outer diameter 2.5 mm material C2680
cylindrical electrodes 33 and 34: outer diameter 6.0 mm length 35.0 mm
composite dielectric bodies 35: base epoxy resin filler (of the $BaTiO_3$ system or the $SrTiO_3$ system) 90% by weight dielectric constant 70
molding: insertion-molding
capacitance: 150 pF (1 KHz, 1 Vrms)

In this example, the results shown in the following Table 1 are obtained with the coefficients $\alpha$ of linear expansion of the feedthrough terminals 31 and 32, the composite dielectric bodies 35 and the insulating resin 43:

TABLE 1.

| part | coefficient of linear expansion ($°C.^{-1}$) |
|---|---|
| feedthrough terminal | $2.0 \times 10^{-5}$ |
| composite dielectric body | $2.0 \times 10^{-5}$ |
| insulating resin | $5.0 \times 10^{-5}$ |
| ceramic | $0.5 \times 10^{-5} \sim 1.5 \times 10^{-5}$ |

Additionally, with a sample of the feed-through capacitor 30 using the composite dielectric bodies 35 containing 20 to 97 percent ceramic powder by weight, the dielectric constant $\epsilon$, the tangent $\delta$ (%), the direct-current breakdown voltage (DCBDV) (kV/mm), the coefficient of linear expansion $\alpha(°C.^{-1})$ are measured, to obtain the results shown in the following Table 2:

TABLE 2

| content | E | tan δ | DCBDV | α |
|---|---|---|---|---|
| 20 | 5 | 0.07 | 59 | $5 \times 10^{-5}$ |
| 50 | 30 | 0.01 | 56 | $3.5 \times 10^{-5}$ |
| 80 | 50 | 0.01 | 52 | $3 \times 10^{-5}$ |
| 90 | 70 | 0.01 | 47 | $2 \times 10^{-5}$ |
| 97 | 240 | 0.02 | 44 | $2 \times 10^{-5}$ |

Figure 10:
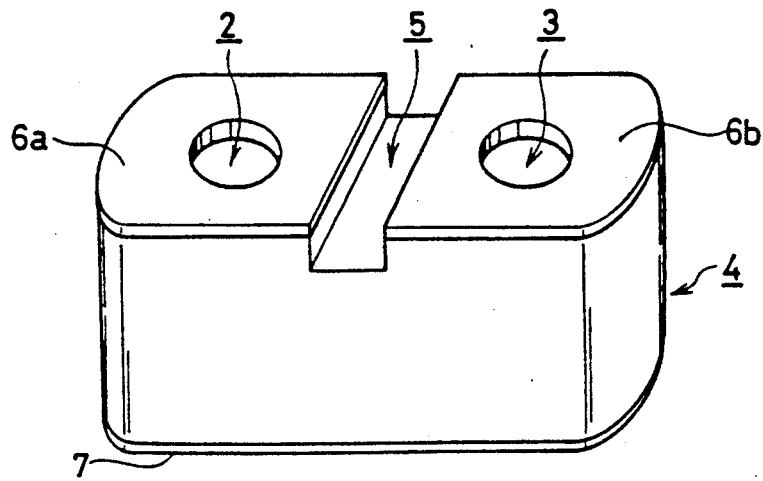
FIG. 10 is a perspective view showing a dielectric block used for constructing the feed-through capacitor shown in FIG. 9.
Figure 11:
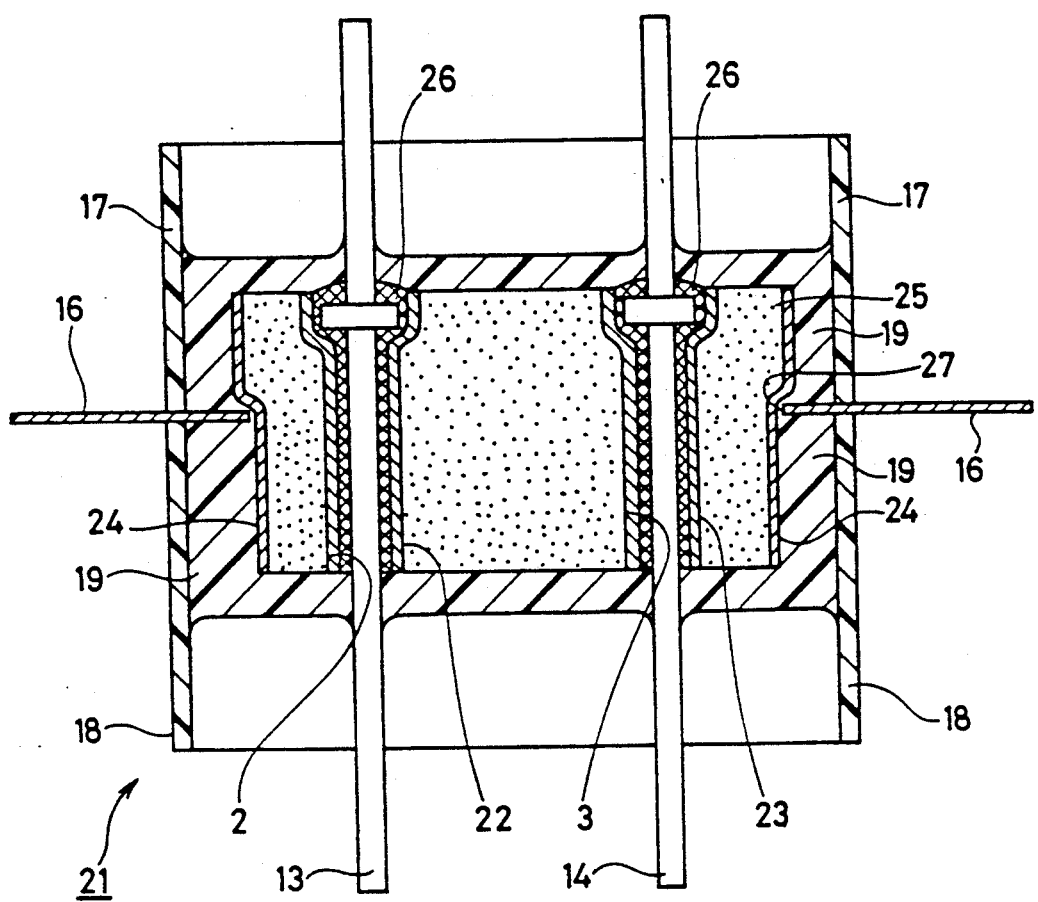
FIG. 11 is a cross-sectional view showing another example of the conventional feed-through capacitor.

As can be seen from the above described Tables 1 and 2, the coefficients $\alpha$ of linear expansion of the feed-through terminals 31 and 32, the composite dielectric bodies 35 and the insulating resin 43 take values close to each other, in the feed-through capacitor 30 shown in FIG. 1. Consequently, the heat shock resistance of the above described feed-through capacitor 30 is improved. It is found that the voltage proof per unit thickness in the above feed-through capacitor 30 becomes larger, for example, 44 to 59 kV/mm, as compared with that in the feed-through capacitor 1 using the dielectric block 4 (see FIG. 10) made of ceramics.

In the above described embodiment, the insulating cases 41 and 42 can be omitted.

Figure 5:
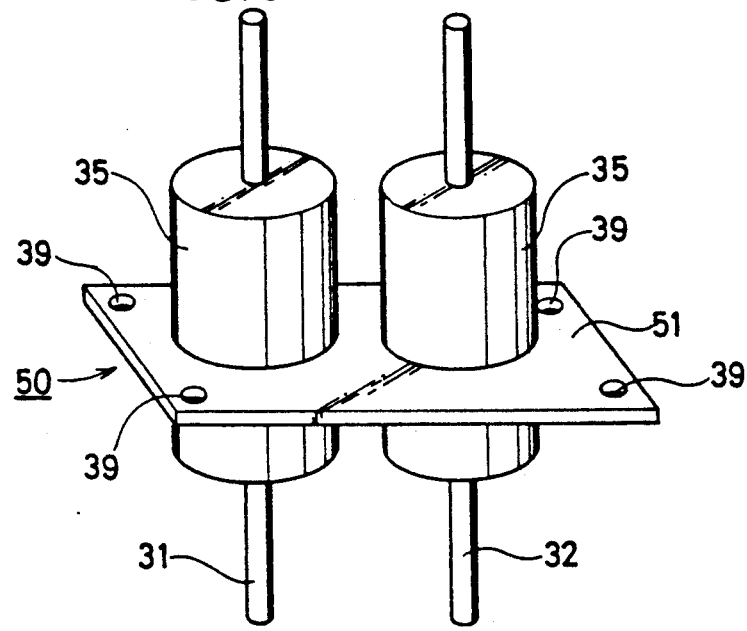
FIG. 5 is a perspective view for explaining a feed-through capacitor according to another embodiment of the present invention.
Figure 6:
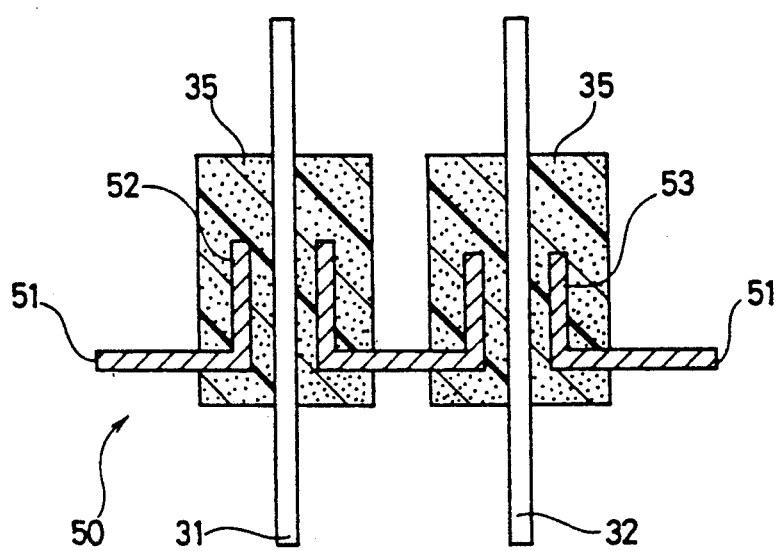
FIG. 6 is a cross-sectional view showing the feed-through capacitor shown in FIG. 5.
Figure 7:
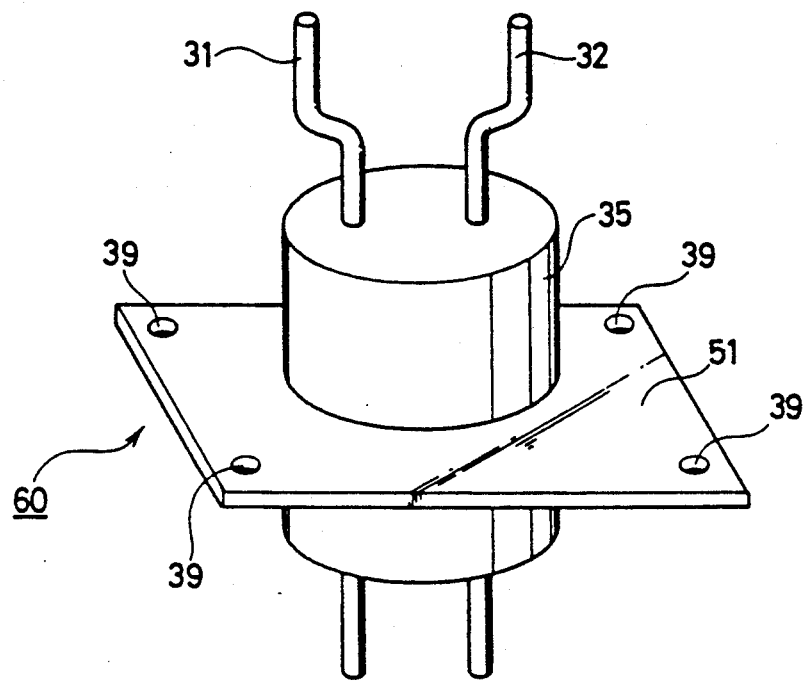
FIG. 7 is a perspective view showing a feed-through capacitor according to still another embodiment of the present invention.
Figure 8:
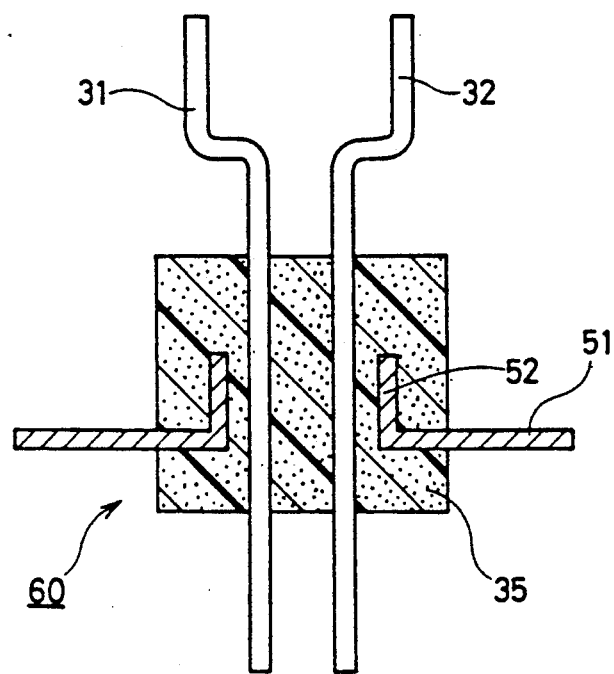
FIG. 8 is a cross-sectional view showing the feed-through capacitor shown in FIG. 7.
Figure 9:
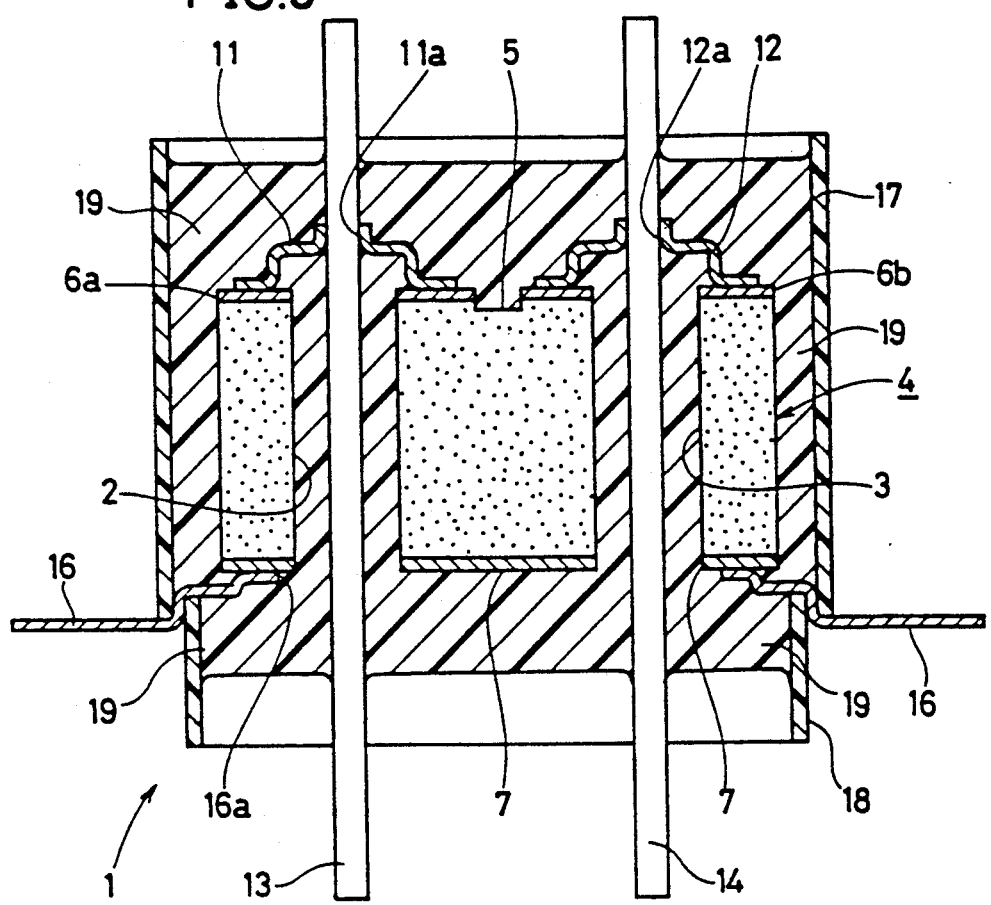
FIG. 9 is a cross-sectional view showing a conventional feed-through capacitor.

FIGS. 5 and 6 show a feed-through capacitor according to another embodiment of the present invention, and FIGS. 7 and 8 show a feed-through capacitor according to still another embodiment of the present invention.

A feed-through capacitor 50 shown in FIGS. 5 and 6 is constructed by respectively forming cylindrical electrode portions 52 and 53 corresponding to the cylindrical electrodes 33 and 34 in the feed-through capacitor shown in FIG. 1 integrally with a ground terminal board 51 and molding composite dielectric bodies 35 in a cylinder shape by a insertion-molding process with feedthrough terminals 31 and 32 being respectively positioned along axes of the cylindrical electrode portions 52 and 53.

Such a structure mades it possible to obtain a lower cost feed-through capacitor in which the number of parts are reduced, as compared with the feed-through capacitor shown in FIG. 1.

On the other hand, a feed-through capacitor 60 shown in FIGS. 7 and 8 is constructed by insertion molding two feedthrough terminals 31 and 32 into one composite dielectric body 35, which is otherwise similar to the feed-through capacitor 50 shown in FIGS. 5 and 6. Thus constructed, a lower cost feed-through capacitor simpler in structure can be obtained In the above described embodiments, as the resin constituting the base of the composite dielectric body 35, a thermoplastic resin such as polybutylene terephthalate resin can be used in addition to thermosetting resin such as epoxy resin. In addition, although in the above described embodiments, two feed-through capacitors are constructed, one feed-through capacitor may also be constructed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A feed-through capacitor comprising:
    at least one feedthrough terminal;
    an outer electrode terminal arranged so as to surround said feedthrough terminal; and
    a composite dielectric layer provided in at least a region between said feedthrough terminal and said outer electrode terminal and made of mixed material containing a resin material and a dielectric powder, said capacitor being formed by said feedthrough terminal, said outer electrode and said composite dielectric.

2. The feed-through capacitor according to claim 1, wherein said composite dielectric layer, surrounding the feed-feedthrough terminal and inside the outer electrode terminal, is formed by insertion-molding.

3. The feed-through capacitor according to claim 1, wherein said composite dielectric layer also extend outside of said outer electrode terminal, and said outer electrode terminal is embedded in the composite dielectric layer.

4. The feed-through capacitor according to claim 3, wherein said composite dielectric layer, surrounding the feedthrough terminal and the outer electrode terminal, is formed by insertion molding.

5. The feed-through capacitor according to claim 3, wherein a plurality of feedthrough terminals are surrounded by one outer electrode terminal.

6. The feed-through capacitor according to claim 1, wherein a plurality of feedthrough terminals are surrounded by one outer electrode terminal.

7. The feed-through capacitor according to claim 1, which further comprises a case containing the feed-through terminal excluding end portions thereof, and containing the outer electrode terminal and the composite dielectric layer, and said case being filled with insulating resin.

8. The feed-through capacitor according to claim 1, wherein said mixed material consists essentially of 20 to 97 percent by weight of the ceramic powder and 3 to 80 percent by weight of the resin material.

9. The feed-through capacitor according to claim 8, wherein said ceramic powder is a $BaTiO_3$ system ceramic.

10. The feed-through capacitor according to claim 8, wherein said ceramic powder is a $SrTiO_3$ system ceramic.

11. The feed-through capacitor according to claim 8, wherein said resin material is epoxy resin.

12. The feed-through capacitor according to claim 8, wherein said resin material is polybutylene terephthalate resin.

13. A method of fabricating a feedthrough capacitor, comprising the steps of:
preparing at least one feed-through terminal and an outer electrode terminal of such size that the feed-through terminal can be inserted into the interior thereof;
arranging said feedthrough terminal within said outer electrode terminal so as not to come into contact with the outer electrode terminal; and
filling a mixed material continuing a resin material and a dielectric powder into the space between said outer electrode terminal and said feedthrough terminal in a molten state and solidifying the same to form a composite dielectric layer to serve as the dielectric for said feed-through capacitor.

14. The method according to claim 13, wherein said mixed material is filled and solidified by an insertion-molding process.

15. The feed-through capacitor according to claim 13, wherein said mixed material consists essentially of 20 to 97 percent by weight of the ceramic powder and 3 to 80 percent by weight of the resin material.

16. The feed-through capacitor according to claim 15, wherein said ceramic powder is a $BaTiO_3$ system ceramic.

17. The feed-through capacitor according to claim 15, wherein said ceramic powder is a $SrTiO_3$ system ceramic.

18. The feed-through capacitor according to claim 15, wherein said resin material is epoxy resin.

19. The feed-through capacitor according to claim 15, wherein said resin material is polybutylene terephthalate resin.

20. A feed-through capacitor comprising:
at least one feed-through terminal;
an outer electrode terminal made of a tubular conductive member arranged so as to surround said feed-through terminal; and
a composite dielectric layer made of a mixed material containing a resin material and a dielectric powder surrounding the feed-through terminal and inside of the outer electrode terminal, said composite dielectric layer being formed by insertion-molding and extending outside of said outer electrode terminal, said outer electrode terminal being embedded in the composite dielectric layer.

21. The feed-through capacitor according to claim 20, wherein said tubular conductive member is integral with a ground terminal which extends away from said tubular conductive member.

22. A feed-through capacitor comprising:
at least one feedthrough terminal;
an outer electrode terminal made of a tubular conductive member arranged so as to surround said feed-through terminal; and
a composite dielectric layer provided in at least a region between said feedthrough terminal and said outer electrode terminal and made of a mixed material containing the resin material and a dielectric powder.

23. The feed-through capacitor according to claim 22, wherein said tubular conductive member is conductively connected with a ground terminal which extends away from said tubular conductive member.

24. The feed-through capacitor according to claim 23, wherein said ground terminal extends transversely away from said tubular conductive member.

25. The feed-through capacitor according to claim 24, further comprising first and second case portions which engage said ground terminal on opposite sides thereof and enclose the outer electrode terminal; the composite dielectric layer; and said feedthrough terminal and ground terminal, except for end portions thereof.

26. The feed-through capacitor according to claim 25, wherein said ground terminal has recess means formed therein for defining engagement locations where said first and second case portions engage said ground terminal.

* * * * *